(12) United States Patent
Delaby et al.

(10) Patent No.: US 12,556,424 B2
(45) Date of Patent: Feb. 17, 2026

(54) PROCESSING OF DATA VOLUMES IN A NETWORK

(71) Applicant: Nokia Solutions and Networks Oy, Espoo (FI)

(72) Inventors: Olivier Delaby, Loyers (BE); Nicolas Dupuis, Chaudfontaine (BE); Axel Van Damme, Loyers (BE); Philippe Dierickx, Saint-Gery (BE)

(73) Assignee: Nokia Solutions and Networks Oy, Espoo (FI)

( * ) Notice: Subject to any disclaimer, the term of this patent is extended or adjusted under 35 U.S.C. 154(b) by 310 days.

(21) Appl. No.: 18/487,540

(22) Filed: Oct. 16, 2023

(65) Prior Publication Data
US 2024/0137241 A1   Apr. 25, 2024
US 2024/0235876 A9   Jul. 11, 2024

(30) Foreign Application Priority Data
Oct. 24, 2022 (EP) ..................................... 22203268

(51) Int. Cl.
*H04L 43/04* (2022.01)
*H04L 12/18* (2006.01)
*H04Q 11/00* (2006.01)

(52) U.S. Cl.
CPC ...... *H04L 12/1886* (2013.01); *H04L 12/1881* (2013.01); *H04L 43/04* (2013.01); *H04Q 11/0067* (2013.01); *H04Q 2011/0084* (2013.01)

(58) Field of Classification Search
None
See application file for complete search history.

(56) References Cited

U.S. PATENT DOCUMENTS

| 2008/0141048 A1* | 6/2008 | Palmer | H04L 67/1012 |
| | | | 713/300 |
| 2021/0176131 A1* | 6/2021 | Zheng | H04L 41/0886 |
| 2023/0155702 A1* | 5/2023 | Wang | G06N 3/0495 |
| | | | 370/252 |

OTHER PUBLICATIONS

Office Communication for European Application No. 22 203 268.2 dated Jun. 27, 2024.

* cited by examiner

*Primary Examiner* — Angela Nguyen
(74) *Attorney, Agent, or Firm* — Harness, Dickey & Pierce, P.L.C.

(57) ABSTRACT

An apparatus, method and computer program is described as obtaining forwarded traffic volume data and discarded traffic volume data of a point-to-multipoint communication network in each of a plurality of discrete time periods over an observation period; generating calibrated forwarded and discarded traffic volume data, wherein calibration data is dependent on a calibration level; filtering, by applying signal processing techniques, multiple instances of said calibrated forwarded and discarded traffic volume data; identifying first sample periods within said observation period; and determining impact scores for the forwarded and discarded traffic volume data for each of said one or more first sample periods.

15 Claims, 15 Drawing Sheets

PROCESSING OF DATA VOLUMES IN A NETWORK

CROSS-REFERENCE TO RELATED APPLICATIONS

The present application claims priority under 35 U.S.C. § 119 to European Patent Application No. 22203268.2, filed on Oct. 24, 2022, in the European Patent Office, the entire contents of each of which are hereby incorporated by reference.

FIELD

The present specification relates to the processing of forwarded and discarded data volumes in a communications network.

BACKGROUND

Data can be collected relating to the volume of data that is forwarded over a network over time and data that is discarded. There remains a need for further developments in this field.

SUMMARY

In a first aspect, this specification describes an apparatus, a method and a computer program comprising: obtaining forwarded traffic volume data and discarded traffic volume data of a point-to-multipoint communication network in each of a plurality of discrete time periods over an observation period; generating calibrated forwarded and discarded traffic volume data, wherein calibration data is dependent on a calibration level; filtering, by applying signal processing techniques, multiple instances of said calibrated forwarded and discarded traffic volume data; identifying first sample periods (e.g. critical periods) within said observation period; and determining impact scores for the forwarded and discarded traffic volume data for each of said one or more first sample periods. The possible impacts of the forwarded and discarded traffic volume data on quality of service can then be qualified; guidelines for action may then be provided.

In a second aspect, this specification describes an apparatus comprising: means for obtaining forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period; means for generating calibrated forwarded traffic volume data and calibrated discarded traffic volume data by adding calibration data to the forwarded traffic volume data and the discarded traffic volume data respectively, wherein calibration data is dependent on application of multiple calibration levels; means for filtering multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels (said filtering may, for example, comprise wavelet filtering); means for determining, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level; means for identifying one or more first sample periods within said observation period, wherein said first sample periods correspond to time periods of the observation period where the filtered calibrated discarded traffic volume data has an energy level above a threshold calibration level (e.g. a configurable threshold level); and means for determining impact scores for the forwarded traffic volume data and the discarded traffic volume data for each of said one or more first sample periods.

In accordance with example embodiments, impact scores may be generated, for example, as a qualification of the discarded and forwarded volumes that, correlated together, can provide an interpretation regarding the usage of the transmission bandwidth. The impact scores may enable a qualification of the criticality of each identified first sample period. Actions may be recommended or actioned.

The first sample periods may be identified as critical sub-periods of said discarded traffic volume data.

In some example embodiments, the apparatus further comprises: means for determining, for each of a plurality of said first sample periods, and for a plurality of calibration levels, a sum of filter coefficients corresponding to the traffic volume data of said filtered calibrated discarded traffic volume data; and means for determining, for each of the plurality of said first sample periods, and for the plurality of calibration levels, a sum of filter coefficients corresponding to the traffic volume data of said filtered calibrated forwarded traffic volume data. The said means for determining impact scores for the forwarded traffic volume data and the discarded traffic volume data for each of said one or more first sample periods may comprise means for determining normalised summations of the filter coefficients corresponding to said traffic volume data of said filtered calibrated forwarded traffic volume data and said filtered calibrated discarded traffic volume data respectively for said first sample periods.

The apparatus may further comprise means for mapping the impact scores for the forwarded traffic volume data and the discarded traffic volume data onto predetermined zones (e.g. zones on an interpretation map or a decision map) indicative of possible causes of discarded data. The apparatus may further comprise means for configuring said predetermined zones.

Some example embodiments further comprise means for plotting the impact scores for the forwarded traffic volume data and the discarded traffic volume data on a two-dimensional graph.

Some example embodiments further comprise means for taking or recommending action based on the determined impact scores. In some example embodiments, such actions may include action being taken automatically (e.g. without the intervention of an engineer). Such actions (whether automated or taken by an engineer) may include one or more of: reconfiguration of a network; suggesting that the capacity of the network has to be increased; reconfiguring the central node; raising an alert; or restricting access to services.

The calibration padding may comprise calibration padding patterns before and/or after the respective traffic volume data, wherein the calibration padding patterns are dependent on said calibration level.

Some example embodiments further comprise means for configuring said plurality of calibration levels. For example, the number of calibration levels and/or the nature of the padding within each calibration level may be configurable. By way of example, configuration levels may be configurable in order to allow adaptation to the capacity of a respective communication network.

The apparatus may further comprise means for processing filtered calibrated forwarded traffic volume data and filtered calibrated discarded traffic volume data, including removing filtered data corresponding to said calibration padding.

The forwarded traffic volume data and discarded traffic volume data may be determined or measured at a central node of the network.

The network may be a passive optical network; however, it should be noted that the principles described herein are applicable to other networks.

In a third aspect, this specification describes a method comprising: obtaining forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period; generating calibrated forwarded traffic volume data and calibrated discarded traffic volume data by adding calibration data to the forwarded traffic volume data and the discarded traffic volume data respectively, wherein calibration data is dependent on application of multiple calibration levels; filtering (e.g. using wavelet filtering) multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels; determining, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level; identifying one or more first sample periods within said observation period, wherein said first sample periods correspond to time periods of the observation period where the filtered calibrated discarded traffic volume data has an energy level above a threshold calibration level; and determining impact scores for the forwarded traffic volume data and the discarded traffic volume data for each of said one or more first sample periods.

The method may further comprise taking or recommending action based on the determined impact scores. For example, the method may further comprise providing guidance and/or recommendations for action(s). In some example embodiments, such actions may include action being taken automatically (e.g. without the intervention of an engineer). Such actions (whether automated or taken by an engineer) may include one or more of: reconfiguration of a network; suggesting that the capacity of the network has to be increased; reconfiguring the central node; raising an alert; or restricting access to services.

The impact scores may be generated, for example, as a qualification of the discarded and forwarded volumes that, correlated together, can provide an interpretation regarding the usage of the transmission bandwidth. The impact scores may enable a qualification of the criticality of each identified first sample period. Actions may be recommended or actioned.

The first sample periods may be identified as critical sub-periods of said discarded traffic volume data.

The method may comprise: determining, for each of a plurality of said sample periods, and for a plurality of calibration levels, a sum of filter coefficients corresponding to the traffic volume data of said filtered calibrated discarded traffic volume data; and determining, for each of the plurality of first sample periods, and for the plurality of calibration levels, a sum of filter coefficients corresponding to the traffic volume data of said filtered calibrated forwarded traffic volume data. Determining impact scores for the forwarded traffic volume data and the discarded traffic volume data for each of said one or more first sample periods may comprise determining normalised summations of the filter coefficients corresponding to said traffic volume data of said filtered calibrated forwarded traffic volume data and said filtered calibrated discarded traffic volume data respectively for said first sample periods.

The method may further comprise mapping the impact scores for the forwarded traffic volume data and the discarded traffic volume data onto predetermined zones (e.g. configurable predetermined zones) indicative of possible causes of discarded data. The zones may be zones of an interpretation map or a decision map.

Some example embodiments further comprise plotting the impact scores for the forwarded traffic volume data and the discarded traffic volume data on a two-dimensional graph. Alternatively, or in addition, some example embodiments further comprise taking or recommending action(s) based on the determined impact scores.

The calibration padding may comprise calibration padding patterns before and/or after the respective traffic volume data, wherein the calibration padding patterns are dependent on said calibration level.

Some example embodiments comprise configuring said plurality of calibration levels.

The method may further comprise processing filtered calibrated forwarded traffic volume data and filtered calibrated discarded traffic volume data, including removing filtered data corresponding to said calibration padding.

The forwarded traffic volume data and discarded traffic volume data may be determined or measured at a central node of the network.

In a fourth aspect, this specification describes computer-readable instructions which, when executed by a computing apparatus, cause the computing apparatus to perform any method as described herein (including the method of the third aspect described above).

In a fifth aspect, this specification describes a computer-readable medium (such as a non-transitory computer-readable medium) comprising program instructions stored thereon for performing any method as described herein (including the method of the third aspect described above).

In a sixth aspect, this specification describes an apparatus comprising: at least one processor; and at least one memory including computer program code which, when executed by the at least one processor, causes the apparatus to perform (at least) any method as described herein (including the method of the third aspect described above).

In a seventh aspect, this specification describes a computer program comprising instructions for causing an apparatus to perform at least the following: obtain forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period; generate calibrated forwarded traffic volume data and calibrated discarded traffic volume data by adding calibration data to the forwarded traffic volume data and the discarded traffic volume data respectively, wherein calibration data is dependent on application of multiple calibration levels; filter multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels; determine, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level; identify one or more first sample periods within said observation period, wherein said first sample periods correspond to time periods of the observation period where the filtered calibrated discarded traffic volume data has an energy level above a threshold calibration level; and determine impact scores for the forwarded traffic volume data and the discarded traffic volume data for each of said one or more first sample periods.

Optional features of the seventh aspect may comprises any features of the second aspect.

In an eighth aspect, this specification describes: input(s) or receiver(s) (or some other means) for obtaining forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period; a pre-processing module (or some other means) for generating calibrated forwarded traffic volume data and calibrated discarded traffic volume data by adding calibration data to the forwarded traffic volume data and the discarded traffic volume data respectively, wherein calibration data is dependent on application of multiple calibration levels; a filter module, such as a wavelet filtering module, (or some other means) for filtering multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels; a processing module (or some other means) for determining, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level; a critical sample determining module (or some other means) for identifying one or more first sample periods within said observation period, wherein said first sample periods correspond to time periods of the observation period where the filtered calibrated discarded traffic volume data has an energy level above a threshold calibration level; and an output module (or some other means) for determining impact scores for the forwarded traffic volume data and the discarded traffic volume data for each of said one or more first sample periods.

In a ninth aspect, this specification describes a central node of a point-to-multipoint communication network and further comprising an apparatus as described herein (including the apparatus of the second aspect described above).

In a tenth aspect, this specification describes a point-to-multipoint communication network and further comprising an apparatus as described herein (including the apparatus of the second aspect described above).

BRIEF DESCRIPTION OF THE DRAWINGS

Example embodiments will now be described, by way of example only, with reference to the following schematic drawings, in which.

DETAILED DESCRIPTION

Figure 1:
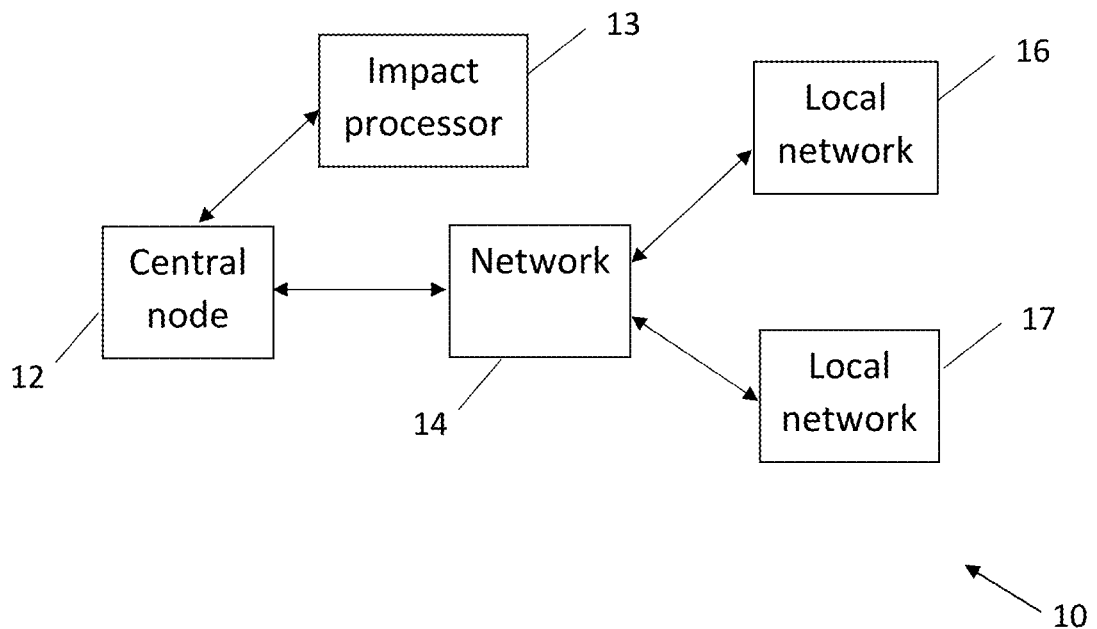
FIG. 1 is a block diagram of a communications network in accordance with an example embodiment.

The scope of protection sought for various embodiments of the disclosure is set out by the independent claims. The embodiments and features, if any, described in the specification that do not fall under the scope of the independent claims are to be interpreted as examples useful for understanding various embodiments of the disclosure.

In the description and drawings, like reference numerals refer to like elements throughout.

FIG. 1 is a block diagram of a communications network, indicated generally by the reference numeral 10, in accordance with an example embodiment.

The network 10 comprises a central node 12, an impact processor 13, a network 14 (e.g. an access network), a first local network 16 and a second local network 17. The system is an example of a point-to-multipoint network in which data are sent from the central node 12 to multiple local networks. In one example embodiment, the network is a passive optical network (PON) and the network 14 is an access network, although the principles described herein are applicable to other networks (particularly to other point-to-multipoint networks). Moreover, the principles described herein can be applied in other scenarios, such as to upstream traffic.

As discussed in detail below, the impact processor 13 is provided to process forwarded traffic volume data (relating to an aggregate volume of traffic that is forwarded from the central node 12 to one of the local networks 16, 17) and discarded traffic volume data (relating to a volume of data that is discarded at the central node, and is therefore not forwarded to the local networks). The impact processor 12 may form part of the central node 12; alternatively, the impact processor may be provided elsewhere and may receive data from the central node 12. Moreover, an impact processor in accordance with the principles described may be used to process other data, such as upstream data. For example, in some embodiments, the "forwarded data" may refer to traffic sent over a link towards the central node 12 and "discarded data" may refer to data discarded at a local network.

Despite the increase of capacity of the broadband networks like Digital Subscriber Line (DSL) and Gigabit Passive Optical Network (GPON), end users demand higher bandwidth and improved continuity in the quality of services like IPTV, Video-over-the-top, triple-play, etc.

In this context, in order to gain new customers and retain existing ones, operators tend to offer services and sell contacts promising very high download volumes (e.g. up to 500 MB/s or even 1 GB/s over GPON/XG(S)PON technologies).

It is possible that operators may overcommit the maximum capacity of their infrastructure, which, combined with users pushing the limit of consumption, can lead to saturation of the communication links. This leads to a rise in discarded traffic on the central office side (e.g. at the central node 12 of the system 10), due to overload of the communications link or capping of end-user services resulting, for example, in increased latency and a degradation in quality-of-service (QoS) of the services provided to the customers.

The impact processor 13 may be provided, for example, to detect, recognize and qualify periods of saturation leading to potential QoS degradation in the delivery of services to customers, such as the local networks 16 and 17 in the system 10.

Figure 2:
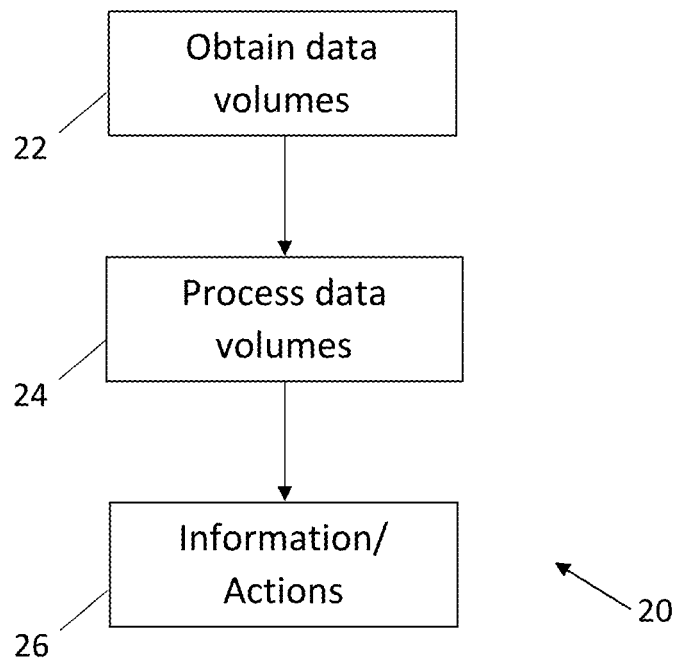
FIG. 2 is a flow chart showing an algorithm in accordance with an example embodiment.

FIG. 2 is a flow chart showing an algorithm, indicated generally by the reference numeral 20, in accordance with an example embodiment. The algorithm 20 may be implemented by the impact processor 13 described above.

The algorithm 20 starts at operation 22, where data volumes are obtained. The data volumes include the aggregated volume of data forwarded from the central node 12 (e.g. to the local networks 16 and 17 and hence to end users). The data volumes also include the volume of data discarded at the central node 12. As discussed in detail below, the data volumes include forwarded traffic volume data relating to aggregated volumes of data forwarded over a point-to-multipoint network in each of a plurality of discrete time periods over an observation period and discarded traffic volume data as discarded at the central node 12 in each of the plurality of discrete time periods over the observation period.

At operation 24, the data volumes obtained in the operation 22 are processed. As discussed in detail below, whilst the cause of the discarding of data at the central node 12 may be saturation of the access network 14, this is not the only possibility. The data processing in the operation 24 seeks to determine patterns in the data, for example to identify underlying causes of discarding of data.

At operation 26, information may be provided to a user (e.g. a network operator) and/or actions may be proposed or taken in response to the output of the data processing operation 24.

As discussed in detail below, the operation 26 may involve providing information to an operator (e.g. a network operator or engineer). Such information may comprise a plot of impact scores for the forwarded traffic volume data and the discarded traffic volume data on a two-dimensional graph; such a plot may be provided to an engineer as an output of a diagnostic tool. Alternatively, or in addition, the operation 26 may involve action being recommended or taken. In some example embodiments, such actions may include action being taken automatically (e.g. without the intervention of an engineer). Such actions (whether automated or taken by an engineer) may include reconfiguration of a network (such as reconfiguring the user's profile (temporarily or note) to afford a higher bandwidth for a particular service to afford a higher bandwidth of a particular service), suggesting that the capacity of the network has to be increased, reconfiguring the central node (e.g. to reconfigure queues at the central note or checking for possible software issues at the central node), raising an alert (e.g. on detection of a likely fault), or restricting access to services (e.g. temporarily).

FIGS. 3 to 6 are plots, indicated generally by the reference numerals 30, 40, 50 and 60 respectively, showing data relating to different example scenarios. The plots 30 to 60 depict different cases, critical or not, where the presence of abnormal patterns in the evolution of discarded traffic is a sign of affected transmitted traffic, possibly explaining the reasons of some saturation of the forwarded traffic volume.

Figure 3:
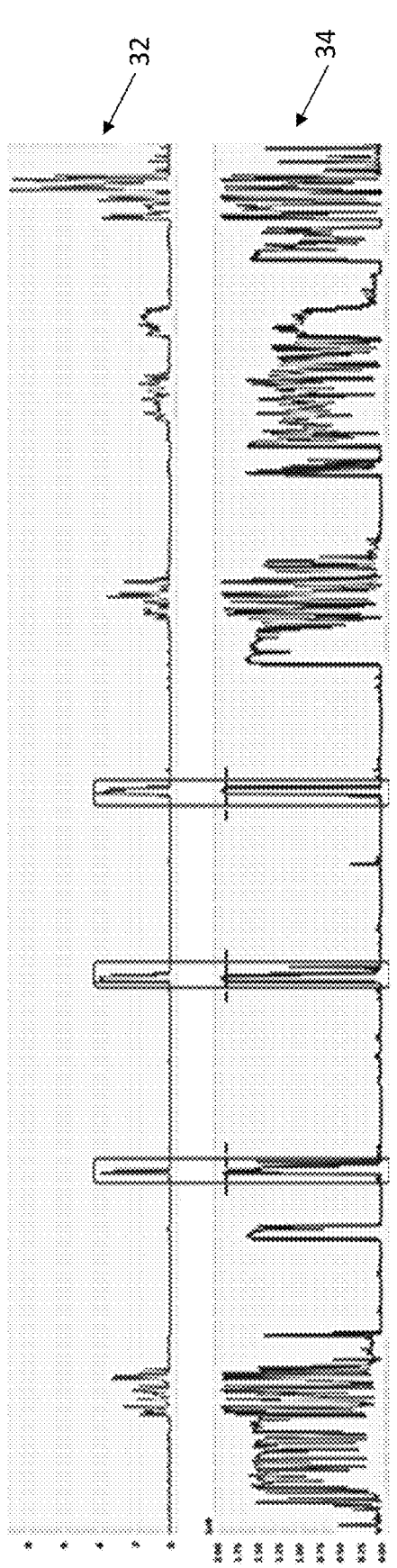
FIGS. 3 to 6 are plots showing data relating to different example scenarios.

FIG. 3 is a plot, indicated generally by the reference numeral 30, showing data relating to an example scenario. The plot 30 shows, by way of example, discarded traffic volume data 32 as collected in a plurality of five minute intervals. Similarly, the plot 30 shows, by way of example, forwarded traffic volume data 34 as collected in the same plurality of five minute intervals. The plot 30 shows high data discard levels when the data traffic is maintained at its highest level (e.g. around 1 Mbps in this example). In this example, the discarding of data is linked to higher demand and a sign that traffic may be capped during some critical periods. Of course, many variants are possible (such as different data levels or different periods of which data volumes are collected).

Figure 4:
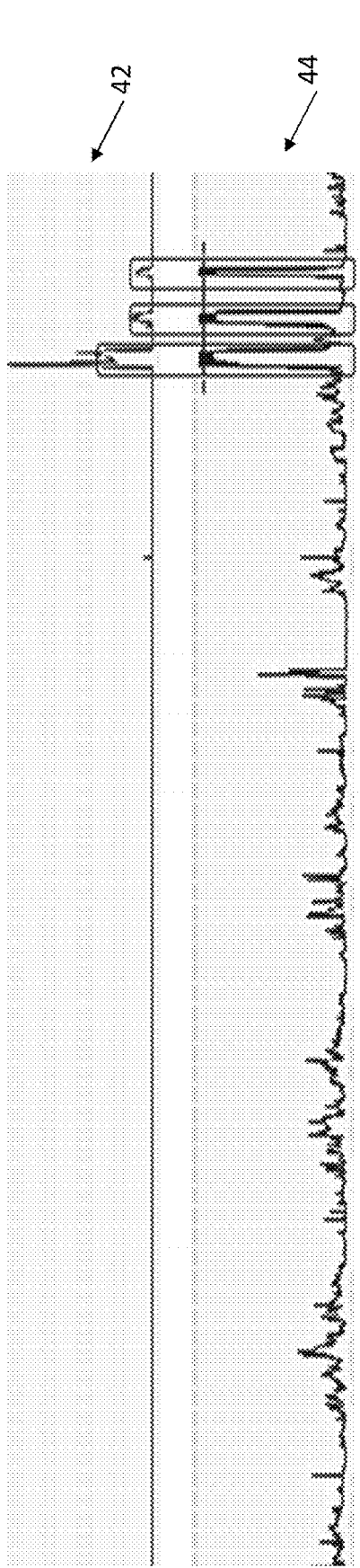

FIG. 4 is a plot, indicated generally by the reference numeral 40, showing data relating to an example scenario. The plot 40 shows discarded traffic volume data 42 as collected in a plurality of five minute intervals and forwarded traffic volume data 44 as collected in the same plurality of five minute intervals. The plot 40 shows high data discard levels when the data traffic is maintained at its highest level (around 500 Kbps). In this example, the discarding of data is linked to higher demand and a sign that traffic is capped during some critical periods.

Figures 5, 6:
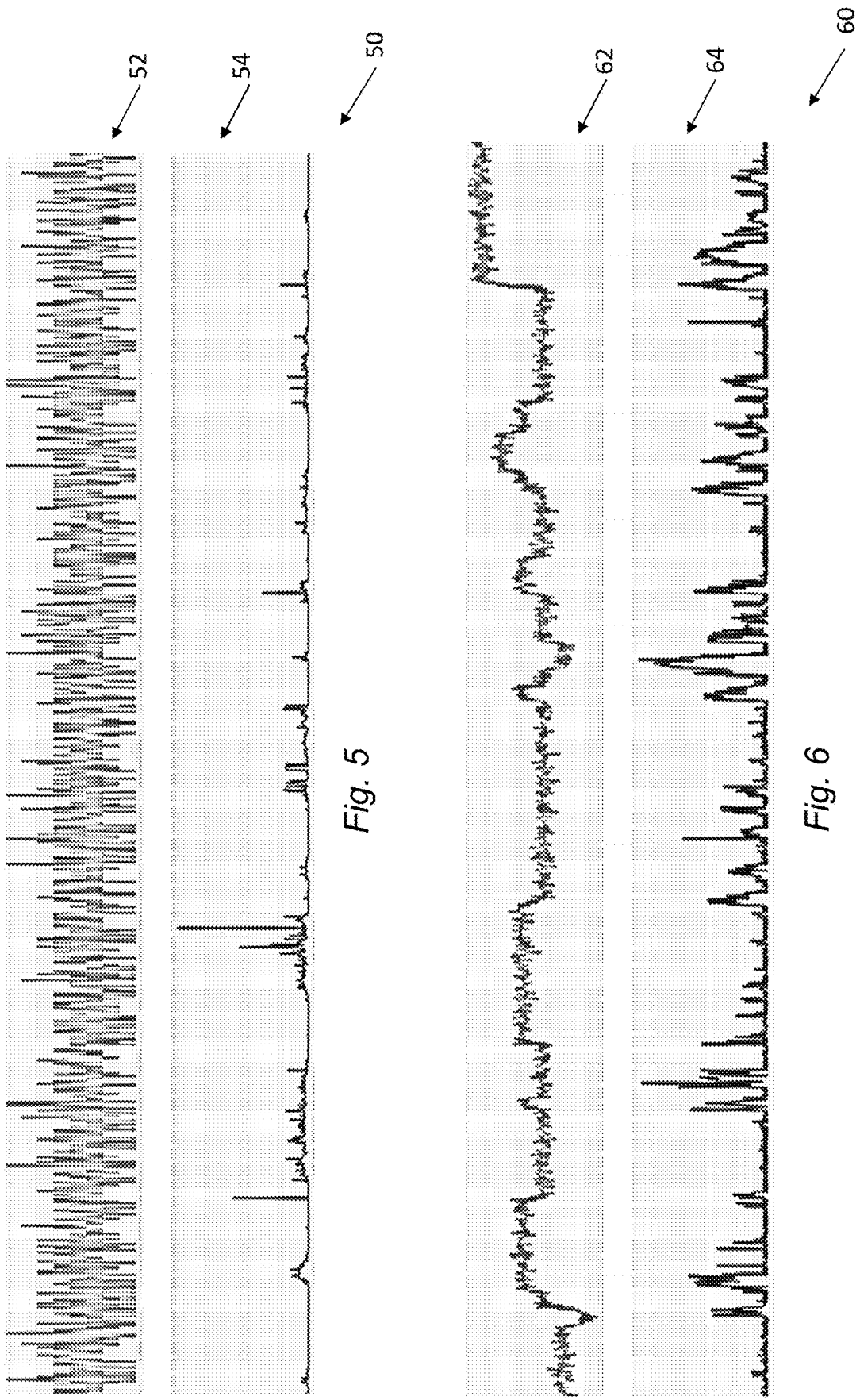

FIG. 5 is a plot, indicated generally by the reference numeral 50, showing data relating to an example scenario. The plot 50 shows discarded traffic volume data 52 as collected in a plurality of five minute intervals and forwarded traffic volume data 54 as collected in the same plurality of five minute intervals. In the plot 50, there is no clear pattern to the discarded data. In particular, there is no clear relationship between forwarded data volumes and discarded data volumes. Accordingly, there is no sign of saturation in the access network.

FIG. 6 is a plot, indicated generally by the reference numeral 60, showing data relating to an example scenario. The plot 60 shows discarded traffic volume data 62 as collected in a plurality of five minute intervals and forwarded traffic volume data 64 as collected in the same plurality of five minute intervals. In the plot 60, the discarded data levels are quite high, but fairly constant (fluctuating around 100 Kbps). Again, there is no sign of saturation in the access network.

Figure 7:
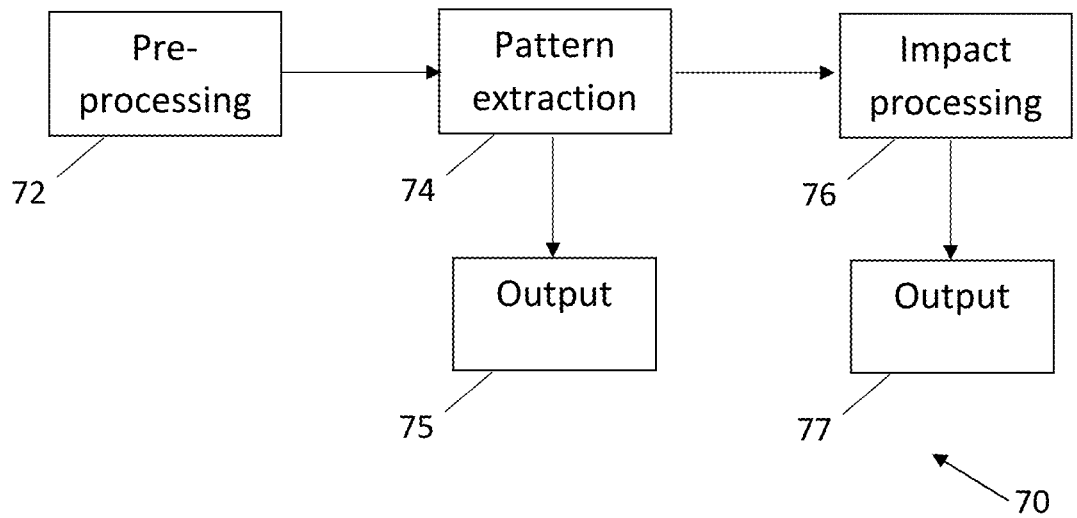
FIG. 7 is a block diagram of a system in accordance with an example embodiment.

FIG. 7 is a block diagram of a system, indicated generally by the reference numeral 70, in accordance with an example embodiment. The system 70 seeks to process data, such as the discarded and forwarded data volumes shown in the plots 30 to 60 described above. The system 70 is an example implementation of the impact processor 13 described above.

The system 70 comprises a pre-processing module 72, a pattern extraction module 74 and an impact processing module 76. The pattern extraction module 74 may provide an output 75. Similarly, the impact processing module 76 may provide an output 77. Example outputs are discussed below by way of example. It should be noted that one or both of the outputs may be omitted, or alternative outputs or actions provided.

Figure 8:
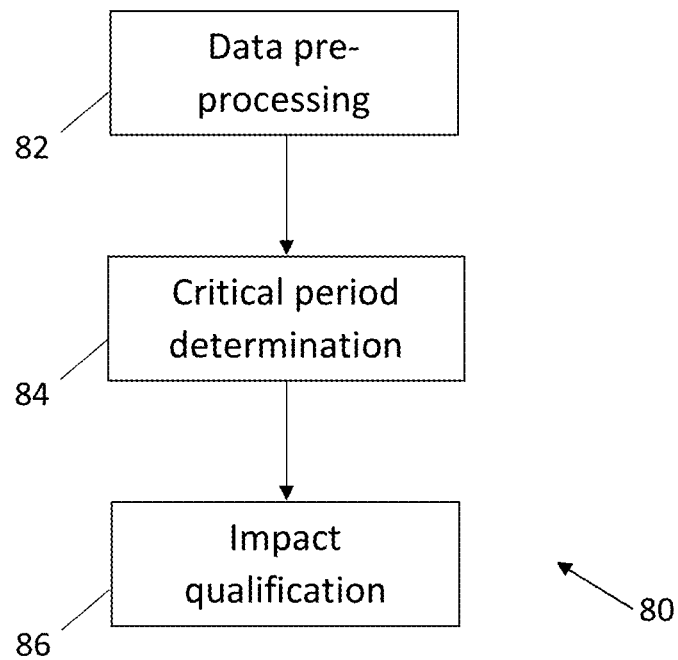
FIG. 8 is a flow chart showing an algorithm in accordance with an example embodiment.

FIG. 8 is a flow chart showing an algorithm indicated generally by the reference numeral 80, in accordance with an example embodiment. The algorithm 80 may be implemented by the system 70 described above.

The algorithm 80 starts at operation 82, where data is pre-processed, for example by the pre-processing module 72. The pre-processing may include data validity checks and/or data formatting (such as data truncation) to meet the needs of a particular impact process, for example truncation of forwarded traffic volume data and discarded traffic volume data as received at the impact processor 13 from the central node 12 of the system 10. The output of the operation 82 may be one of the data sets shown in the plots 30 to 60 described above.

At operation 84, one or more critical periods are determined, for example by the pattern extraction module 74. As discussed further below, critical periods may be determined based on the identification of patterns in the discarded traffic volume data. The output 75 (if provided) may provide information relating to the identified critical periods, such as a plot in which the identified critical periods are highlighted.

The operation 84 may receive data including (but not limited to) discarded traffic volume data as measured at a central point of a communication system (such as the central node 12 of the system 10 described above) and forwarded traffic volume data as provided over communication links (such as the network 14 of the system 10) serving one or more end users (such as users of the local networks 16 and 17 of the system 10). Indeed the traffic volume data may relate to data provided to a plurality of users of the relevant communication system.

As discussed in detail below, the operation 84 may comprise: generating calibrated forwarded traffic volume data and calibrated discarded traffic volume data; filtering multiple instances of said calibrated forwarded traffic volume data and multiple instances of said calibrated discarded traffic volume data to generate respective filtered calibrated forwarded traffic volume data and filtered calibrated discarded traffic volume data; identifying one or more first sample periods (i.e. critical periods) within said observation period, wherein said first sample periods correspond to time periods of the observation period where the filtered calibrated discarded traffic volume data has an energy level above a threshold calibration level.

At operation 86, an impact is determined. The impact may relate to a qualification of the criticality of the periods determined in the operation 84.

As discussed in detail below, the operation 86 may comprise determining impact scores for the forwarded traffic volume data and the discarded traffic volume data for each of one or more first sample periods (e.g. critical periods). Alternatively, or in addition, the operation 86 may comprise mapping such impact scores onto predetermined zones indicative of possible causes of discarded data. Such zones may be configurable.

Figure 9:
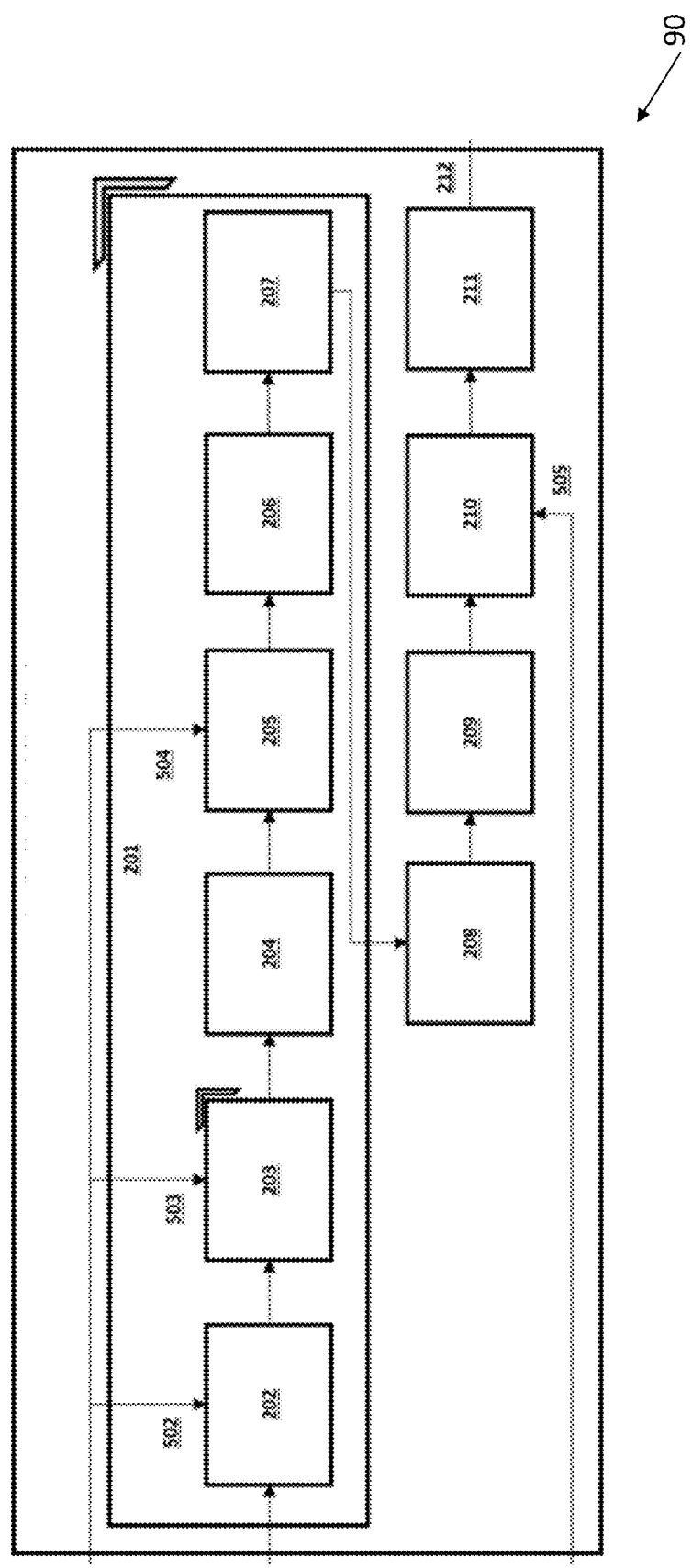
FIG. 9 is a block diagram of a system in accordance with an example embodiment.

FIG. 9 is a block diagram of a system indicated generally by the reference numeral 90, in accordance with an example embodiment. The system 90 is an example implementation of the pattern extraction module 74 and may be used to implement the operation 84 of the algorithm 80 described above.

The system 90 comprises a calibration padding module 202, a wavelet filtering module 203, a normalization/scaling module 204, a coefficient-based cancellation module 205, a calibration padding removal module 206 and an energy score determination module 207 that collected form a first processing module 201. In an example embodiment, the calibration padding removal module 206 additionally implements a truncation step to keep only the part of the curves relevant with respect to the wavelet's longest filter scale. The system 90 further comprises an energy score stacking module 208, a critical sub-period determination module 209, a sub-period filtering module 210 and a critical period labelling module 211. The system 90 provides an output 212 in which critical periods of the received discarded traffic volume data are identified.

It should be noted that the system 90 is provided by way of example only. Functions of the system 90 may be omitted or implemented in other ways; for example, some of the modules of the system 90 may be merged.

As discussed above, the system 90 comprises a calibration padding module 202. In the example embodiment described in detail below, calibration padding is added on the left and right sides of the original relevant data (i.e. before and after the forwarded traffic volume data and the discarded traffic volume data). In each of a plurality of iterations of the use of the system 90, a different calibration level is used in which the calibration padding used is different; this enables the impact of different calibration padding to be determined. In particular, this enables a determination of how impacted the transmitted traffic is with respect to multiple levels of discard; for example, the discard may not be considered to be affecting (is considered irrelevant) with respect to a given level if all the energy extracted in the relevant traffic series is localised in the padding sections and the transmitted signal not being considered high (is considered irrelevant) with respect to a given level if all the energy extracted in the relevant traffic series is localised in the padding sections. Combining the results altogether at the end provides a view of the respective levels above which discard and transmitted volumes may be deemed to be critical.

Figure 10:
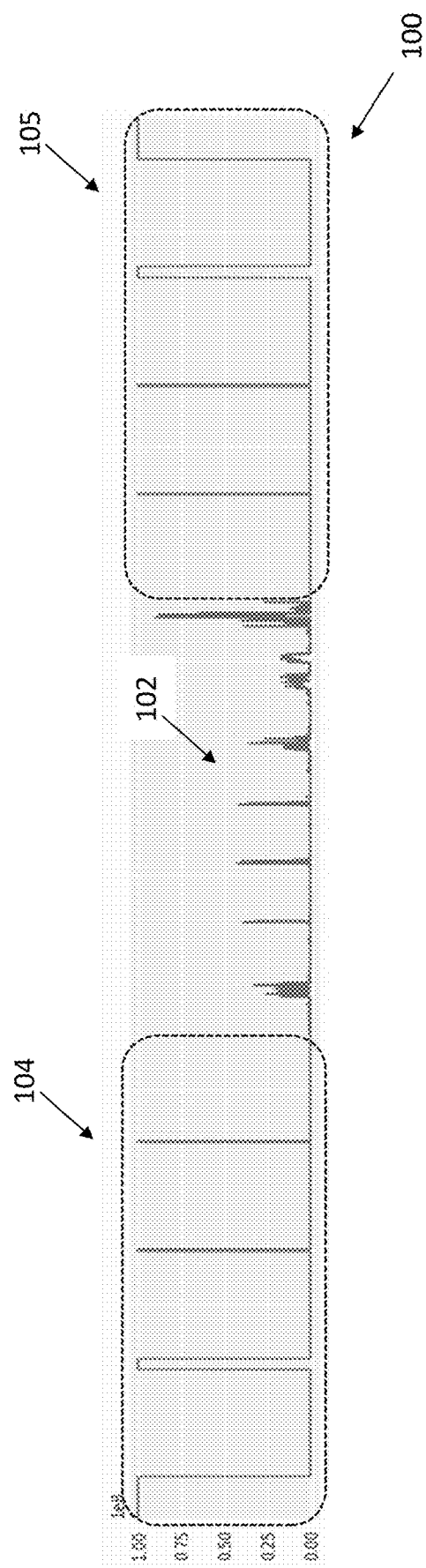
FIG. 10 shows calibrated data in accordance with an example embodiment.

FIG. 10 shows calibrated data, indicated generally by the reference numeral 100, in accordance with an example embodiment. The calibrated data 100 comprises pre-processed volume data 102 as output by the pre-processing module 72. For example, the data 102 may be forwarded traffic volume data or discarded traffic volume data that may have been truncated or otherwise pre-processed. The calibrated data 100 further comprises first padding 104 provided before the volume data 102 and second padding 105 after the volume data 102. Note that it is not essential that padding is provided before and after the volume data 102 (e.g. padding could be provided before, but not after the volume data 102 or vice-versa).

As discussed above, the padding is dependent on the calibration level. In the case where a level of a discarded volume data signal is below the level of the padding, the highest energy in the calibrated data 100 will be concentrated in the padding section (and, as discussed below no critical sub-periods are detected in the signal itself). Conversely, if the level of the discarded volume data signal level is above the level of the padding, the highest energy in the calibrated data 100 will be concentrated in the data section 102 (indicating that the discarded data may be critical).

As discussed above, the system 90 comprises a wavelet filtering module 203. The wavelet filtering module 203 is used to filter the various calibrated data. The wavelet filtering is applied to the padded forwarded and discarded traffic volume data and resulting filter coefficients computed (and stored for later use in the algorithm). Note that the padding 104 and 105 of the calibrated data 100 may comprise shorter to longer plateaus that correspond to the multiple wavelets scales used, capturing so the energy of small peaks (short wavelets scale) to long horizontal periods (longest wavelets scale).

Figure 11:
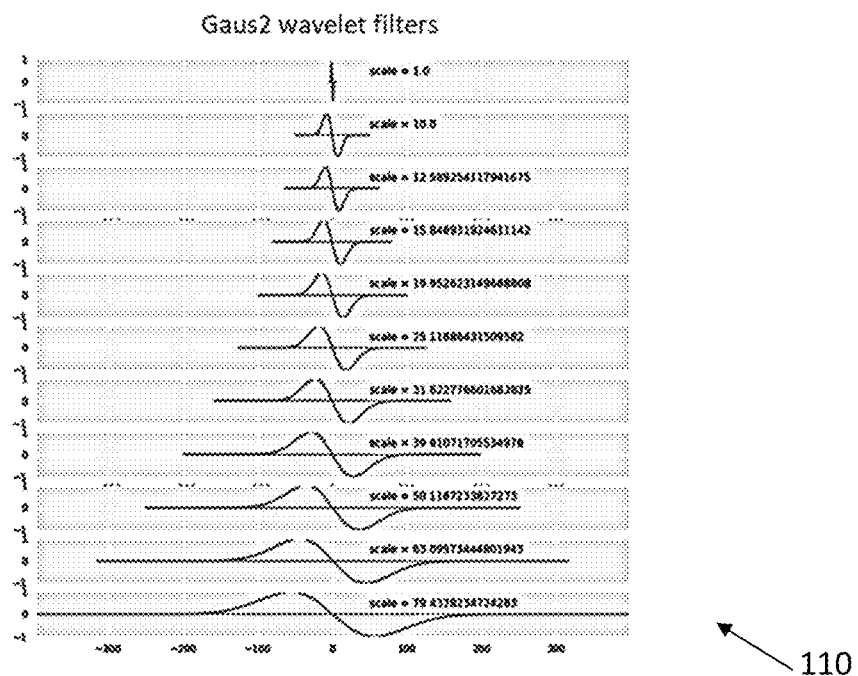
FIG. 11 shows plots of wavelet filters in accordance with an example embodiment.

FIG. 11 shows plots, indicated generally by the reference numeral 110, of wavelet filters in accordance with an example embodiment. Specifically, the plots 110 show shapes of multiple scales of Gaus2 wavelet filters that may be applied in example implementations. The wavelet filters 110 may be applied by the wavelet filtering module 203. It should be noted that although wavelet filtering is described herein, alternative filtering arrangement (such as fast Fourier transforms) may be used in some example embodiments.

Figure 12:
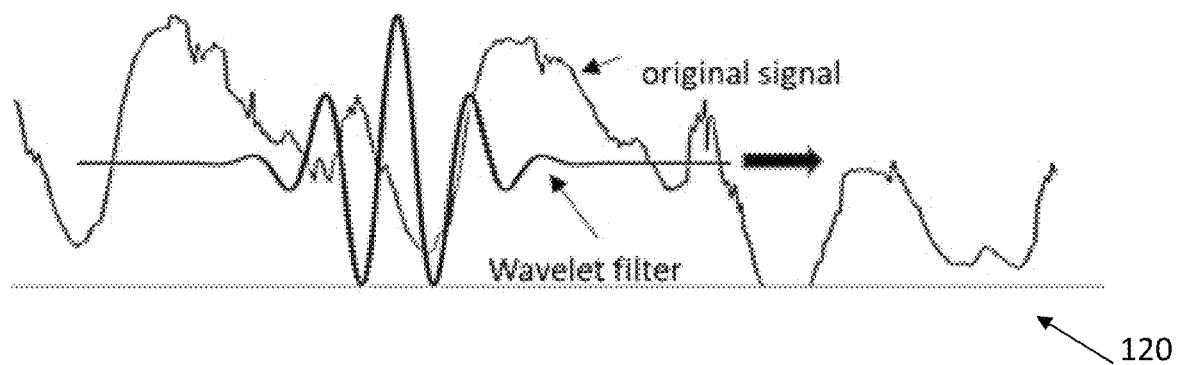
FIG. 12 is a plot showing a use of an example wavelet filter in accordance with an example embodiment.

FIG. 12 is a plot, indicated generally by the reference numeral 120, showing a use of an example wavelet filter in accordance with an example embodiment. For a given scale of the filter, the wavelet filtering module 023 outputs the convolution of the wavelet filter with the original signal (i.e. with the calibrated forwarded traffic volume data or the calibrated discarded traffic volume data).

Figure 13:
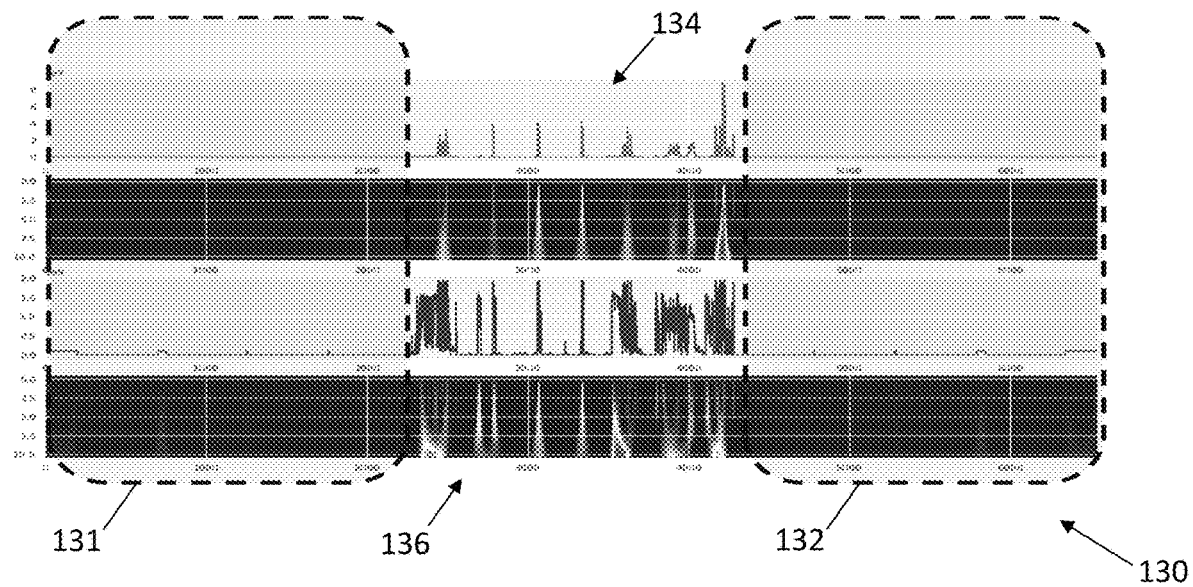
FIGS. 13 to 18 are plots showing data obtained in example embodiments.
Figure 14:
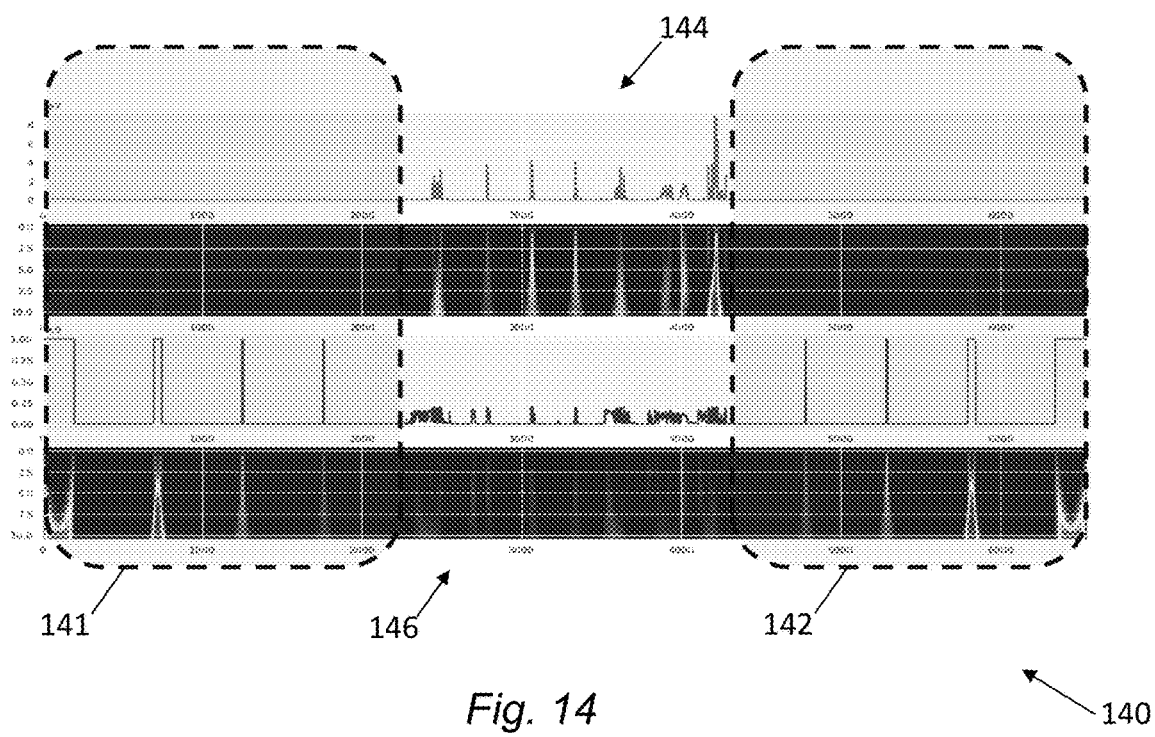
Figure 15:
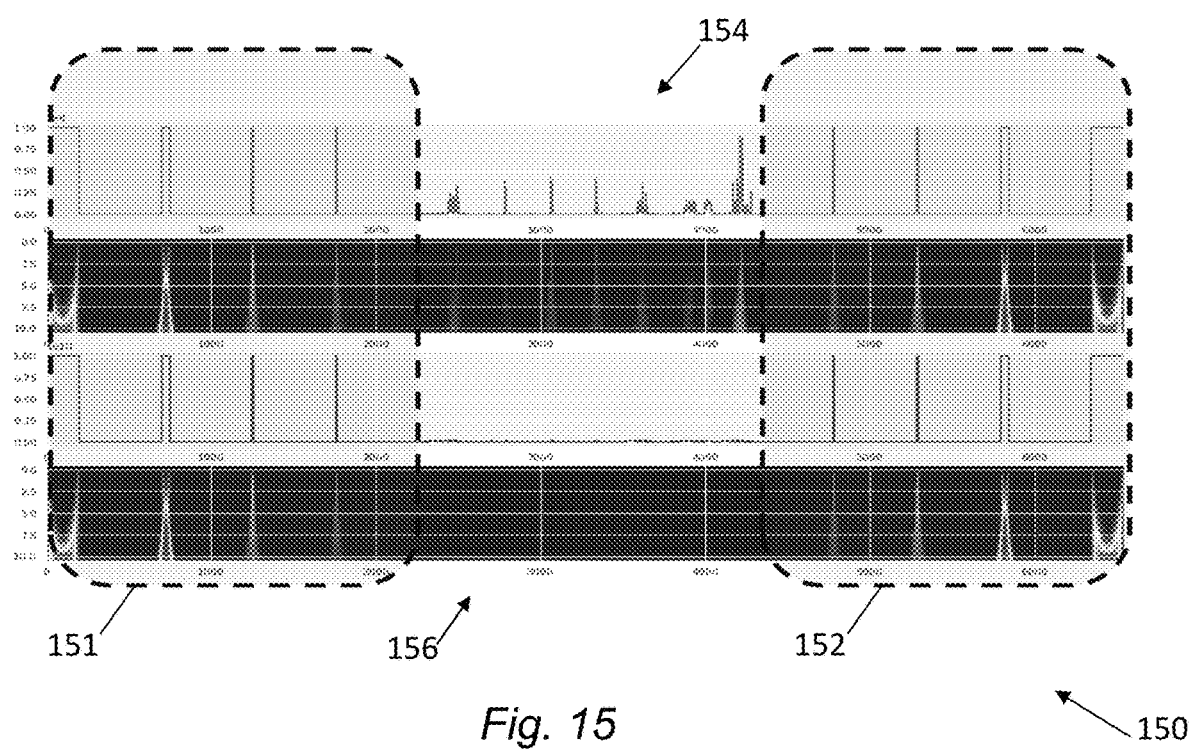

FIGS. 13 to 15 are plots, indicated generally by the reference numerals 130, 140 and 150, showing the filtering of calibrated traffic data at different calibration levels. As discussed further below, the filtering enables zones corresponding to critical sub-periods of the data to be determined.

The plot 130 shown in FIG. 13 shows calibration data 131 provided before discarded traffic volume 134 and forwarded traffic volume 136 data sets and calibration data 132 provided after said data sets. The discarded traffic volume data set 134 includes the original discarded data on the top and the output of the wavelet filtering on the bottom. Similarly, the forwarded traffic volume data set 136 includes the original forwarded data on the top and the output of the wavelet filtering on the bottom. In the plot 130, the level of the calibration data 131 and 132 is below both the level of both the original discarded and forwarded traffic volume data set, such that the energy captured by the wavelet filtering corresponds to zones of highest volumes in both the forwarded and discarded traffic volume signals.

The plot 140 shown in FIG. 14 shows calibration data 141 provided before discarded traffic volume 144 and forwarded traffic volume 146 data sets and calibration data 142 provided after said data sets. The discarded traffic volume data set 144 includes the original discarded data on the top and the output of the wavelet filtering on the bottom. Similarly, the forwarded traffic volume data set 146 includes the original forwarded data on the top and the output of the wavelet filtering on the bottom. In the plot 140, the level of the calibration data is higher than the forwarded traffic volume data, but lower than the discarded traffic volume data. As a result, energy is captured for the discarded traffic volume signals, but little or no energy is captured by the wavelet filtering in the original forwarded traffic volume signal.

The plot 150 shown in FIG. 15 shows calibration data 151 provided before discarded traffic volume 154 and forwarded traffic volume 156 data sets and calibration data 152 provided after said data sets. The discarded traffic volume data set 154 includes the original discarded data on the top and the output of the wavelet filtering on the bottom. Similarly, the forwarded traffic volume data set 156 includes the original forwarded data on the top and the output of the wavelet filtering on the bottom. In the plot 150, the level of the calibration data is higher than both the forwarded traffic volume data and the discarded traffic volume data. As a result, little energy is captured by the wavelet filtering for either the discarded traffic volume signals or the forwarded traffic volume signal.

The plots 130 to 150 show example outputs of the wavelet filtering module 203 of the system 90.

The output of the wavelet filtering module 203 takes the form of a plurality of wavelet filter coefficients. Those coefficients are normalized (e.g. using minmax scaling) by the normalization/scaling module 204. (Note that the use of wavelet filtering is not essential to all example embodiments; alternative data processing, such as the user of fast Fourier transforms, may be used in addition to, or instead of, wavelet filtering.)

The coefficient cancellation module 205 of the system 90 sets coefficients that are below a threshold level to zero in order to cancel the effect of irrelevantly low values that may otherwise be highlighted during the determination of critical periods.

The calibration padding removal module 206 of the system 90 removes the data relating to the calibration padding.

The energy score determination module 207 of the system 90 determines a global score per sample, by summing of all the coefficients for discarded traffic on per sample basis. Thus the coefficients corresponding to a given sample of the series are summed to provide an energy score for each sample of the discard series corresponding to a particular calibration level.

The energy score stacking module 208 of the system 90 stacks and normalised the energy scores (i.e. the sum of the wavelets coefficients) for all the calibration levels resulting in a matrix of scores of the length of the valid series length and height equal to the number of calibration levels defined in the global settings. Then a global score per sample of the time series is computed by taking the maximum value of stacked, normalized coefficients to end up with a curve with values between 0 and 1.

Figure 16:
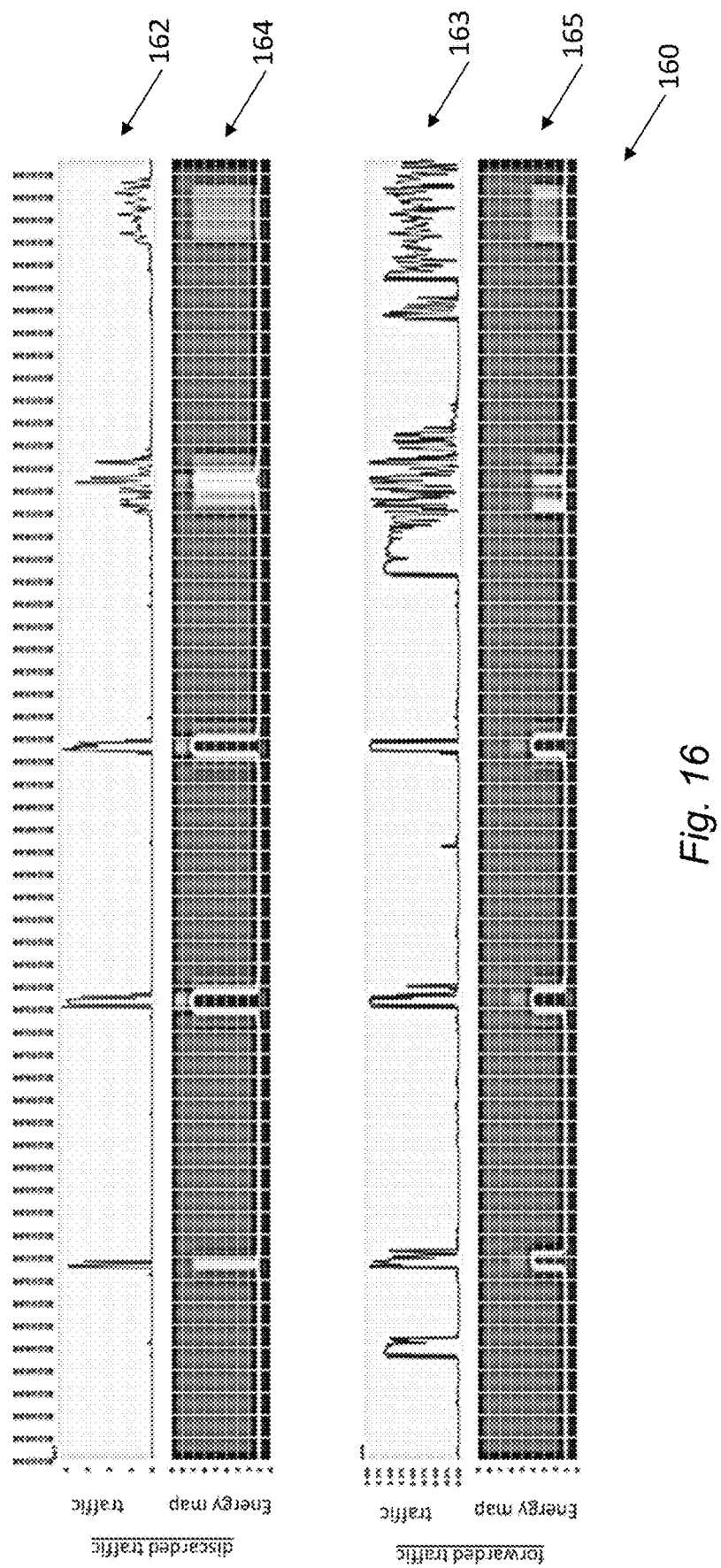

FIG. 16 is a plot, indicated generally by the reference numeral 160, showing data obtained in an example embodiment. The plot 160 includes discarded traffic volume data 162 and forwarded traffic volume data 163, for example as output by the pre-processing module 72 of the system 70. The plot 160 also includes a discarded traffic energy map 164 and a forwarded traffic energy map 165 that may be generated by the pattern extraction module 74 of the system 70.

The energy maps 164 and 165 plot the sum of the wavelet filter outputs for the relevant data sample for each of a plurality of calibration levels (9 calibration levels being plotted in FIG. 16). The energy maps 164 and 165 show how some sub-periods are critical and some are not.

In the example plot 160, the energy map 165 for the forwarded traffic volume data include some periods that are fairly critical but still far from maximum allowed level of consumption. The energy map 164 for the discarded volume traffic data shows several critical zones with very high levels of importance (i.e. critical in terms of data discard).

Figure 17:
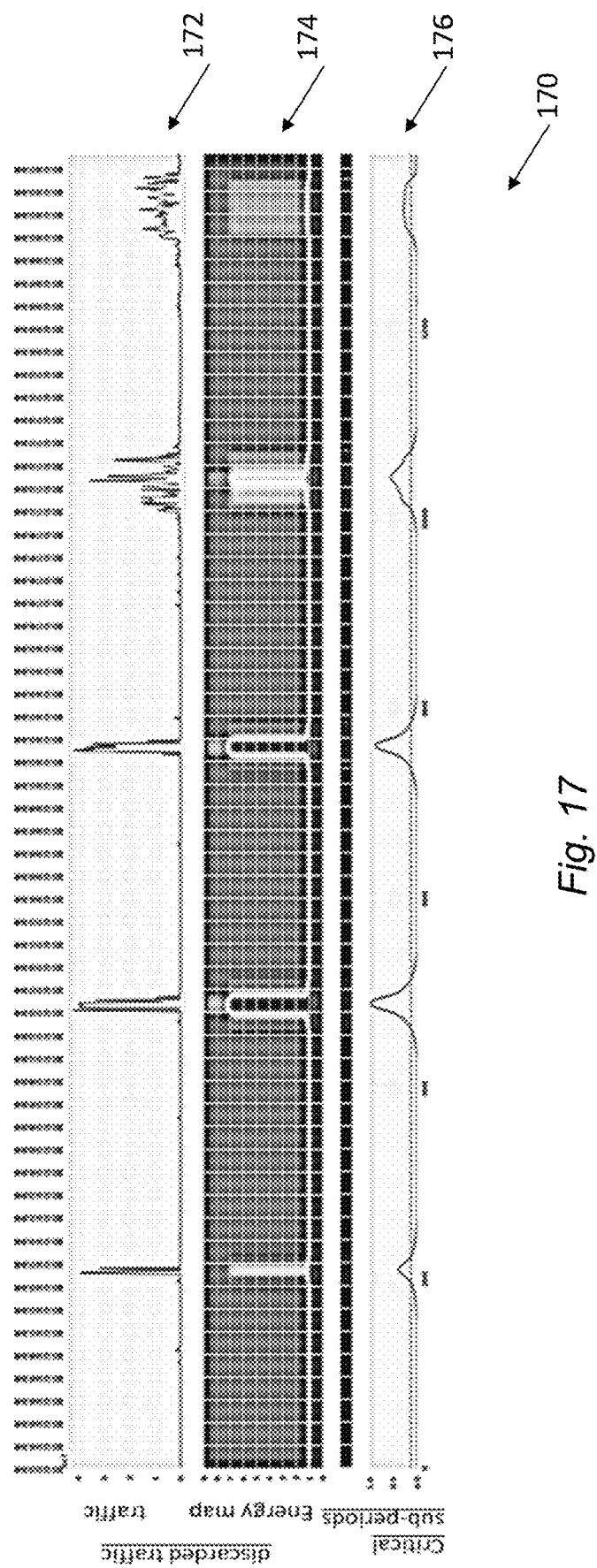

FIG. 17 is a plot, indicated generally by the reference numeral 170, showing data obtained in an example embodiment. The plot 170 shows discarded traffic volume data 172 (similar to the data 162 of the plot 160), a discarded traffic energy map 174 (similar to the energy map 164 of the plot 160), and a critical sub-periods indication 176. The continuous curve of the critical sub-periods indication 176 is generated by stacking and normalization the wavelets coefficients of the filtered discarded traffic volume data computed for every calibration level, ending with a single energy score per sample in range [0 . . . 1].

The critical sub-periods indication 176 may be generated by the critical sub-period determination module 209 of the system 90 described above. The critical sub-period determination module 209 selects samples that are above a statistically meaningful threshold (for example using an IQR based method). All sample values above the threshold get '1', others below the threshold get '0' so that consecutive samples equal to '1' define the critical sub-periods over the whole observation period. Note that the critical sub-periods are determined considering discard volume data levels only (i.e. based on discard related energy scores).

The sub-period filtering module 210 of the system 90 may be used to remove data from the critical sub-periods indication 176 that are relatively short, thereby removing too short periods from consideration as potential critical sub-periods.

Figure 18:
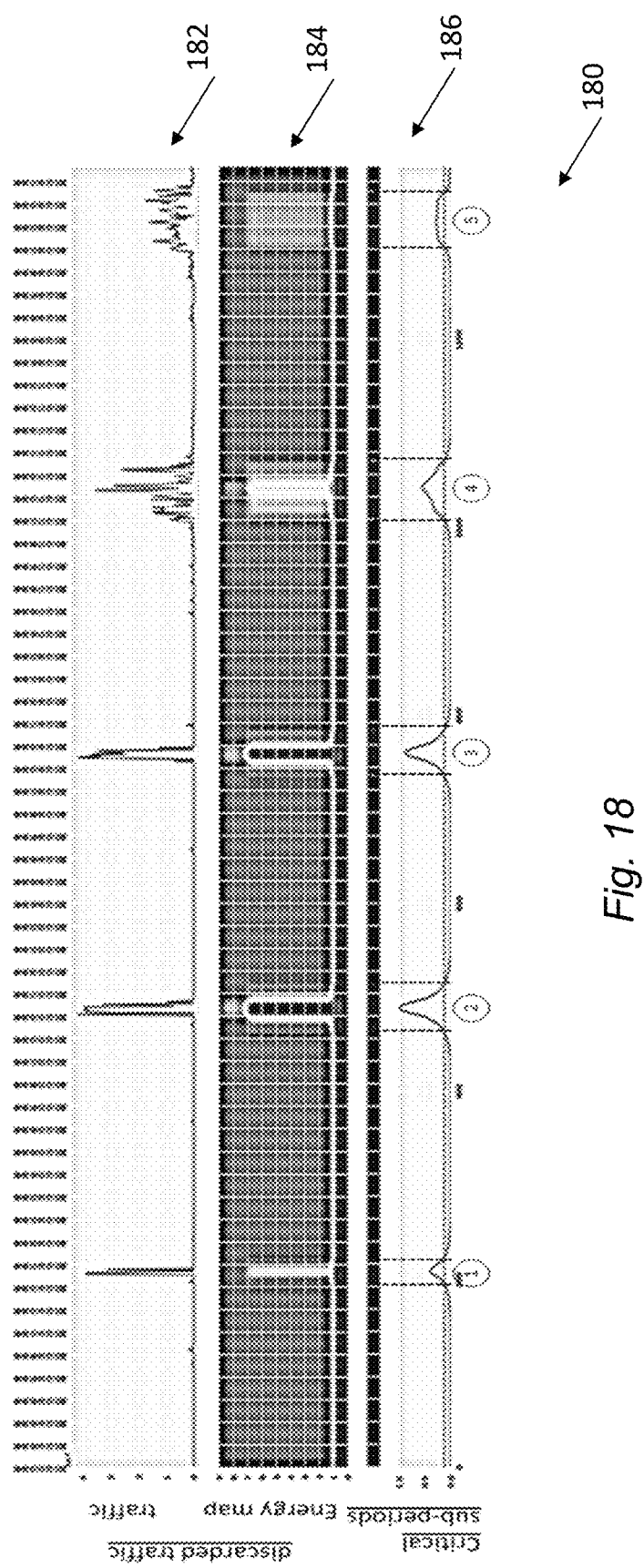

FIG. 18 is a plot, indicated generally by the reference numeral 180, showing data obtained in an example embodiment. The plot 180 shows discarded traffic volume data 182 (similar to the data 162 and 172 described above), a discarded traffic energy map 184 (similar to the energy maps 164 and 174 described above), and a critical sub-periods indication 186 (similar to the indication 176 described above).

The critical sub-period indication 186 shows the result of critical sub-periods selection together with the selection threshold considered (dashed horizontal line) below which the lines representing global critical scores per samples (continuous curve) is not selected. In the example plot 180, five critical sub-zones are identified.

In the system 90, the critical period labelling module 211 may be used to identify each critical sub-period (e.g. the five periods identified in the plot 180). A unique identifier may be given to each identified critical sub-period.

The system 90 then provides an output 212 in which critical periods of the received discarded traffic volume data are identified. The output 212 may comprise a truncated original series, energy scores (stacked, normalized wavelets coefficients), and the sub-period identifiers.

Figure 19:
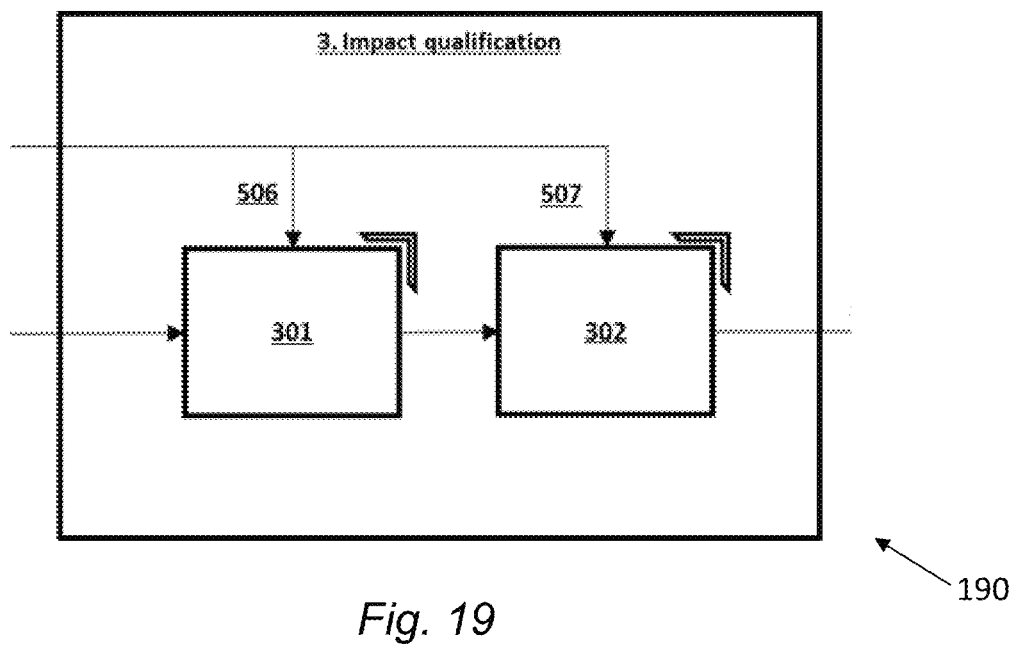
FIG. 19 is a block diagram of a system in accordance with an example embodiment.

FIG. 19 is a block diagram of a system, indicated generally by the reference numeral 190, in accordance with an example embodiment. The system 190 comprises a data processing module 301 and an output generation module 302. The system 190 may be used to implement the impact processing module 76 of the system 70 described above.

The data processing module 301 receives the output of the system 90 described above. For every critical sub-period identified by the system 90, the data processing module 310 computes a global score of forwarded and discarded traffic by computing the Nth percentile (90% for example) below which N % of the values in the sub-period are found, in order to avoid taking into account abnormally high peaks. Considering all the samples belonging to a same sub-period, the computed percentiles of the discarded/forwarded original volumes respectively is compared to fixed, configurable, low and high limits (which may be configurable and be set, for example, with respect to the network capacity limits and requirements and needs of the respective telecommunications company); the final discarded/forwarded scores of a critical period result from the comparison of the computed percentiles with these min and max limits. The scores are in range [0 . . . 1]. Below the lowest defined respective limit the final score is equal to zero. Scores are set to '0' too outside critical sub-periods.

The output generation module 302 generates a plot based on the outputs of the data processing module 301. For example, for every identified critical sub-period, the points at crossing of discard and forward critical scores may be positioned on a explaining/recommendation map, defining the possible explanations of underlying effects observed and possibly underlying actions that can be undertaken by operators, as discussed further below.

Figure 20:
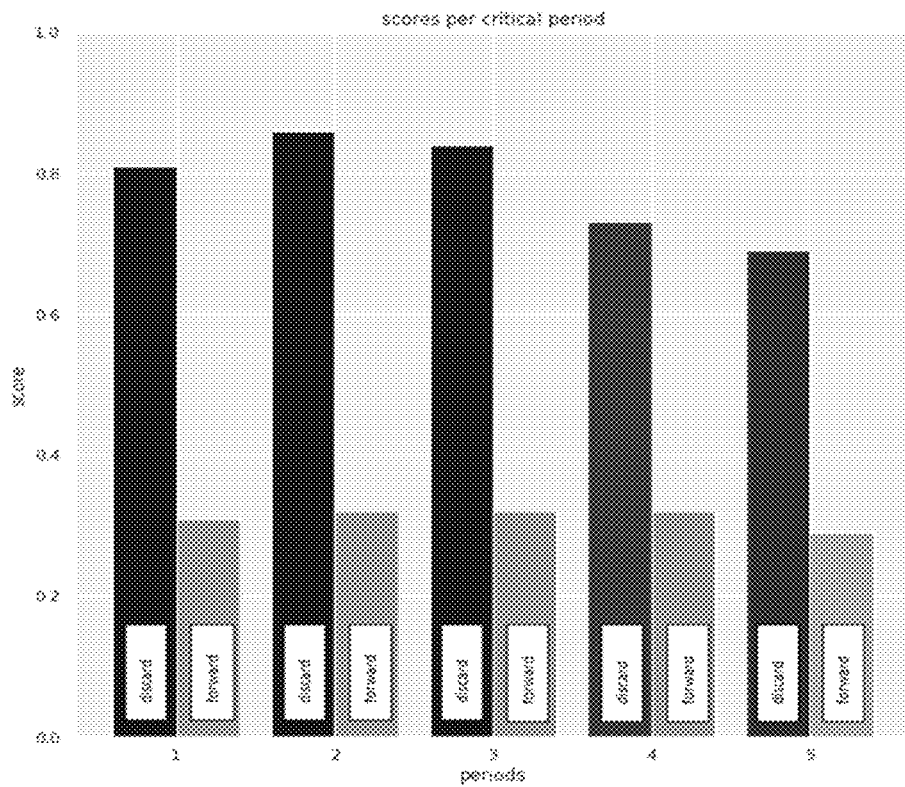
FIGS. 20 and 21 are plots showing data outputs in accordance with example embodiments.

FIG. 20 is a plot, indicated generally by the reference numeral moo, showing a data output in accordance with an example embodiment. The plot moo shows example data that may be generated by the data processing module 301.

The plot 1000 shows separately plots scores given to discarded and forwarded traffic volume data for each identified critical sub-period. The scores are plotted on a [0 . . . 1] scale where 0 corresponds to the defined minimum discard and transmit levels respectively and 1 corresponds to the highest defined discard and transmit levels respectively. For periods 1, 2, 3 in the plot 200, the discard may be considered to be highly critical while the transmitted volume can be higher and is just worth being flagged as "pretty high already".

Figure 21:
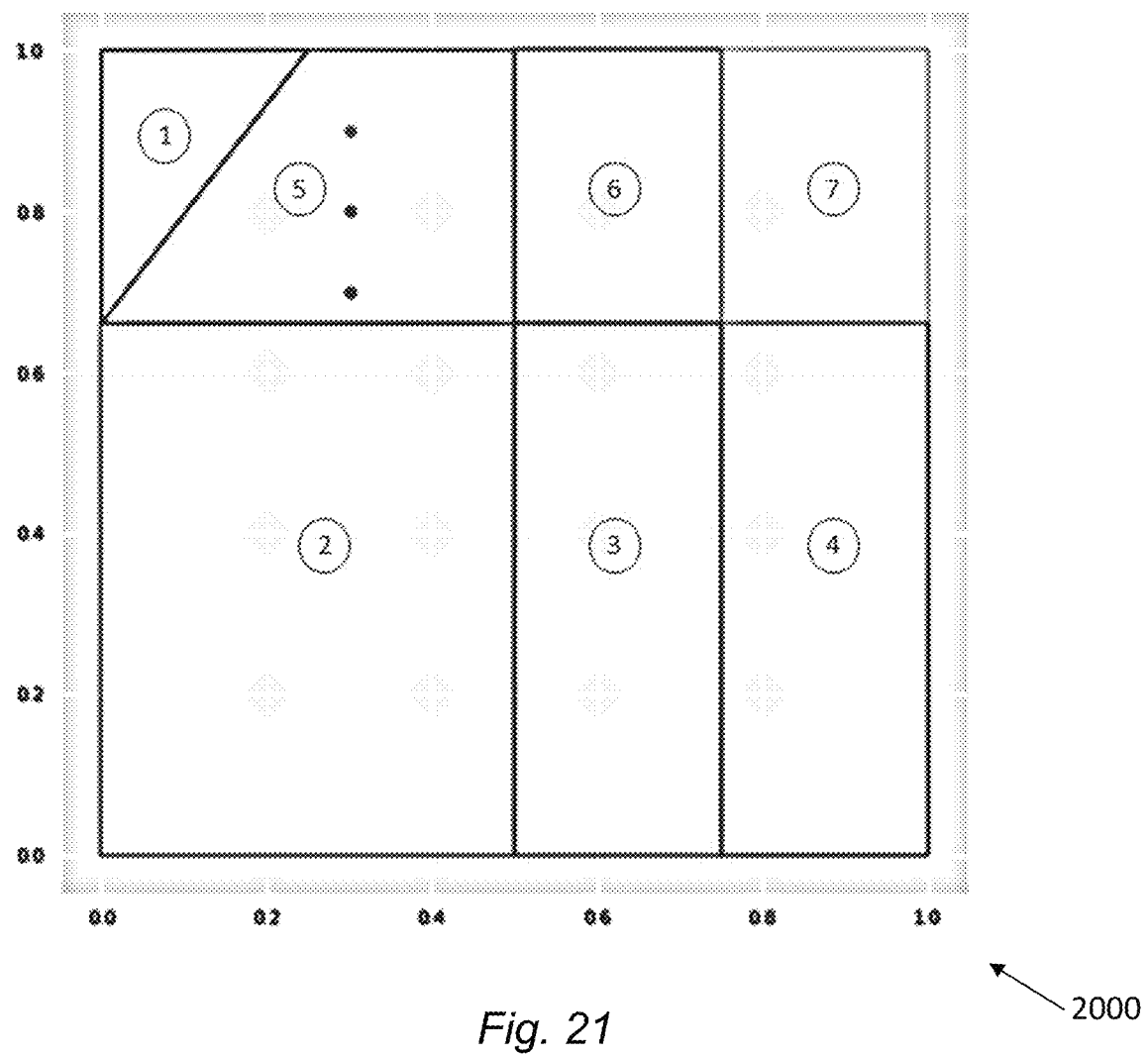

FIG. 21 is a plot, indicated generally by the reference numeral 2000, showing a data output in accordance with an example embodiment. The plot 2000 shows example data that may be generated by the output generation module 302. In the plot 200, the scores related to the forwarded traffic volume data shown of the plot moo are plotted on the x-axis and the scores of the corresponding discarded traffic volume data are plotted on the y-axis.

The plot 2000 includes a number of different zones, each of which has a different possible interpretation of the underlying cause of the identified critical sub-period. Any of the number, the dimensions and the underlying reasons of the zones may be configurable. In the example plot 2000, all of the identified critical sub-periods fall in zone 5.

Example meaning of zones 1-5 as shown in FIG. 21 are listed below. It should be noted that the meanings are provided by way of example only. Alternative implementations may provide different explanations.

Zone 1: Most probably unrealistically high discard with respect to the level of forwarded volume. This may be caused by a software issue (e.g. a software bug). If confirmed not to be a software issues, a denial-of-service (DOS) attack is a possible explanation.

Zone 2: Communication link capacity underused with abnormally high discard. In this instance, discard is not due to traffic level, but could be due to service capping, perhaps as defined in the users' profiles or due to erroneous packets.

Zone 3: Communication link capacity pretty well used but not in excess with abnormally high discard. Again, the discard is not due to traffic levels, but could be due to service capping, perhaps as defined in the users' profiles or due to erroneous packets.

Zone 4: High to very high transmitted volume with abnormally high discard. Discard could be linked and due to high demand from end users.

Zone 5: Communication link capacity underused with abnormally critical discard. Discard is not due to traffic levels and could be due to service capping, perhaps as defined in the users' profiles or due to erroneous packets.

Zone 6: Communication link capacity pretty well used but not in excess with abnormally critical discard. Discards not due to traffic levels but could be due to service capping as defined in users' profiles or due to inner hardware queues being full.

Zone 7: High to very high transmitted volume with abnormally critical discard. Discards could be linked and due to high demand from end user(s). Communication link capacity may be at risk. Inner hardware queues may be full.

Points outside this map, i.e below discard level 0, representing the lowest critical level of the discarded volumes (where the '0' level corresponds to a certain real volume by definition of the settings), represent non-critical situations by default.

Embodiments described herein may be valuable to a network operator by providing an indication that some of the communication links may have reduced quality-of-service (QoS), perhaps before this is noticed by customers. Thus, corrective action may be taken before proactively.

Embodiments may also help to state and quantify the need for upgrading to newer and more powerful technology (like from GPON to XG(S)-PON) while with averaged dimensioning data we would still be blind or theoretically far from this need. Conversely, embodiments may enable problems to be addressed without the need to upgrade systems or accounts.

Indeed, and regardless of the technology, not knowing why there is some discard or what it is made of (e.g. what is actually discarded) is an inherent problem. Putting the discard in relation with a reduction of the traffic transmitted, and better in relation with the traffic transmitted "per service", will make it possible to regulate the distribution of the total bandwidth allocated to an end user per service, and thus regulate and optimize the QoS per service, including independently of any congestion and independently of the maximum capacity of the line.

Figure 22:
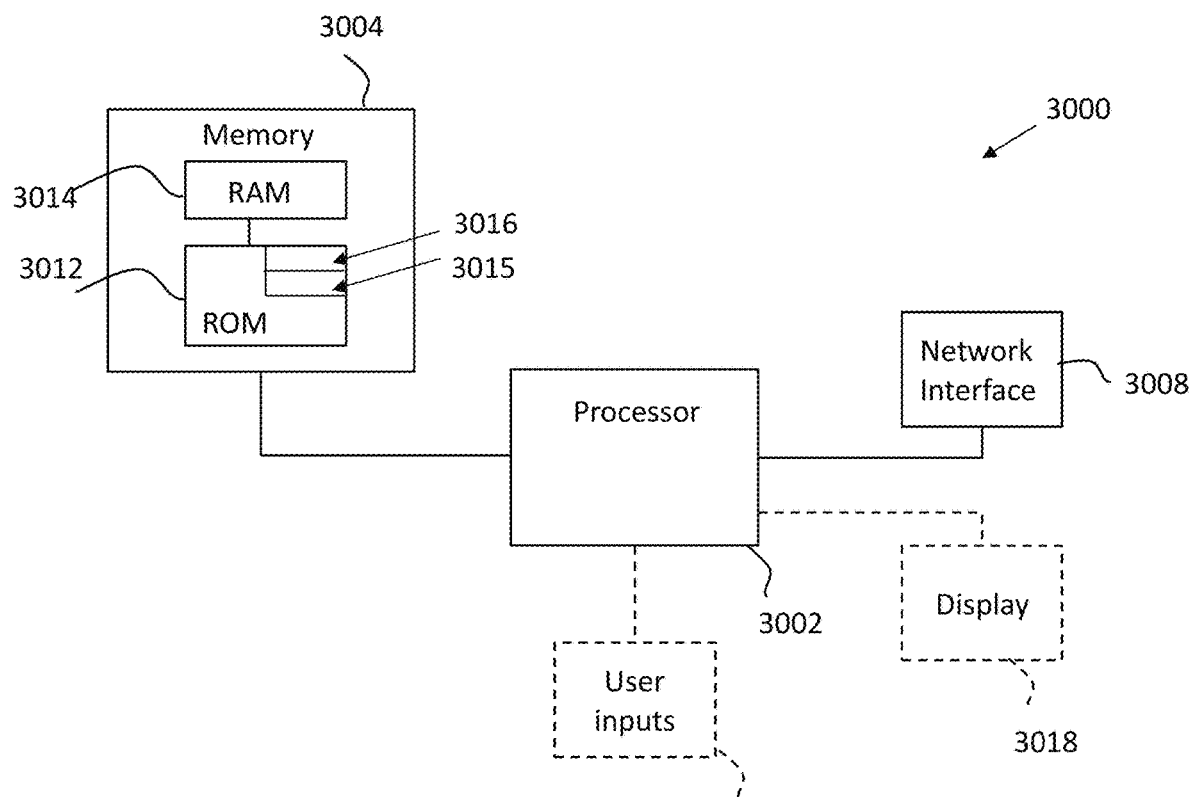
FIG. 22 is a block diagram of components of a system in accordance with an example embodiment.

For completeness, FIG. 22 is a schematic diagram of components of one or more of the example embodiments described previously, which hereafter are referred to generically as a processing system 3000. The processing system 3000 may, for example, be (or may include) the apparatus referred to in the claims below.

The processing system 3000 may have a processor 3002, a memory 3004 coupled to the processor and comprised of a random access memory (RAM) 3014 and a read only memory (ROM) 3012, and, optionally, a user input 3010 and a display 3018. The processing system 3000 may comprise one or more network/apparatus interfaces 3008 for connection to a network/apparatus, e.g. a modem which may be wired or wireless. The network/apparatus interface 3008 may also operate as a connection to other apparatus such as device/apparatus which is not network side apparatus. Thus, direct connection between devices/apparatus without network participation is possible.

The processor 3002 is connected to each of the other components in order to control operation thereof.

The memory 3004 may comprise a non-volatile memory, such as a hard disk drive (HDD) or a solid state drive (SSD). The ROM 3012 of the memory 3004 stores, amongst other things, an operating system 3015 and may store software applications 3016. The RAM 3014 of the memory 3004 is used by the processor 3002 for the temporary storage of data. The operating system 3015 may contain code which, when executed by the processor implements aspects of the methods and algorithms 20 and 80 described above. Note that in the case of small device/apparatus the memory can be most suitable for small size usage i.e. not always a hard disk drive (HDD) or a solid state drive (SSD) is used.

The processor 3002 may take any suitable form. For instance, it may be a microcontroller, a plurality of microcontrollers, a processor, or a plurality of processors.

The processing system 3000 may be a standalone computer, a server, a console, or a network thereof. The processing system 3000 and needed structural parts may be all inside device/apparatus such as IoT device/apparatus i.e. embedded to very small size.

In some example embodiments, the processing system 3000 may also be associated with external software applications. These may be applications stored on a remote server device/apparatus and may run partly or exclusively on the remote server device/apparatus. These applications may be termed cloud-hosted applications. The processing system 3000 may be in communication with the remote server device/apparatus in order to utilize the software application stored there.

Figure 23:
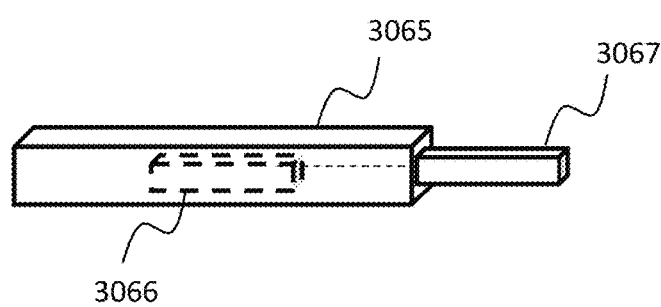
FIG. 23 shows an example of tangible media for storing computer-readable code which when run by a computer may perform methods according to example embodiments described above.

FIG. 23 shows tangible media, specifically a removable memory unit 3065, storing computer-readable code which when run by a computer may perform methods according to example embodiments described above. The removable memory unit 3065 may be a memory stick, e.g. a USB memory stick, having internal memory 3066 for storing the computer-readable code. The internal memory 3066 may be accessed by a computer system via a connector 3067. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one memory configured to store instructions; and
at least one processor configured to execute the instructions and cause the apparatus to perform,
obtaining forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period;
generating calibrated forwarded traffic volume data and calibrated discarded traffic volume data by adding calibration data to the forwarded traffic volume data and the discarded traffic volume data respectively, wherein calibration data is dependent on application of multiple calibration levels;
filtering multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels;
determining, for each instance of said calibrated forwarded traffic volume data and said calibrated discarded traffic volume data whether periods of relatively high energy are concentrated in calibration data section (s) of the respective calibrated data of said filtered data or in traffic volume data of said filtered data and, if energy is determined to be concentrated in the traffic volume data, determining that the respective volume data has an energy level above the respective calibration level;
identifying one or more first sample periods within said observation period, wherein said first sample periods correspond to time periods of the observation period where the filtered calibrated discarded traffic volume data has an energy level above a threshold calibration level; and
determining impact scores for the forwarded traffic volume data and the discarded traffic volume data for each of said one or more first sample periods.

2. An apparatus as claimed in claim 1, wherein said first sample periods are identified as critical sub-periods of said discarded traffic volume data.

3. An apparatus as claimed in claim 1, wherein the apparatus is further caused to perform:
determining, for each of a plurality of said first sample periods, and for a plurality of calibration levels, a sum of filter coefficients corresponding to the traffic volume data of said filtered calibrated discarded traffic volume data; and
determining, for each of the plurality of first sample periods, and for the plurality of calibration levels, a sum of filter coefficients corresponding to the traffic volume data of said filtered calibrated forwarded traffic volume data.

4. An apparatus as claimed in claim 3, wherein said determining impact scores for the forwarded traffic volume data and the discarded traffic volume data for each of said one or more first sample periods comprises determining normalised summations of the filter coefficients corresponding to said traffic volume data of said filtered calibrated forwarded traffic volume data and said filtered calibrated discarded traffic volume data respectively for said first sample periods.

5. An apparatus as claimed in claim 1, wherein the apparatus is further caused to perform:

mapping the impact scores for the forwarded traffic volume data and the discarded traffic volume data onto predetermined zones indicative of possible causes of discarded data.

6. An apparatus as claimed in claim 5, wherein the apparatus is further caused to perform:
configuring said predetermined zones.

7. An apparatus as claimed in claim 1, wherein the apparatus is further caused to perform:
plotting the impact scores for the forwarded traffic volume data and the discarded traffic volume data on a two-dimensional graph.

8. An apparatus as claimed in claim 1, wherein the apparatus is further caused to perform:
taking or recommending action based on the determined impact scores.

9. An apparatus as claimed in claim 1, wherein said filtering comprises wavelet filtering.

10. An apparatus as claimed in claim 1, wherein said calibration padding comprises calibration padding patterns before and/or after the respective traffic volume data, wherein the calibration padding patterns are dependent on said calibration level.

11. An apparatus as claimed in claim 1, wherein the apparatus is further caused to perform:
configuring said plurality of calibration levels.

12. An apparatus as claimed in claim 1, wherein the forwarded traffic volume data and discarded traffic volume data are determined or measured at a central node of the network.

13. An apparatus as claimed in claim 1, wherein the network is a passive optical network.

14. A method comprising:
obtaining forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period;
generating calibrated forwarded traffic volume data and calibrated discarded traffic volume data by adding calibration data to the forwarded traffic volume data and the discarded traffic volume data respectively, wherein calibration data is dependent on application of multiple calibration levels;
filtering multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels;
determining, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level;
identifying one or more first sample periods within said observation period, wherein said first sample periods correspond to time periods of the observation period where the filtered calibrated discarded traffic volume data has an energy level above a threshold calibration level; and
determining impact scores for the forwarded traffic volume data and the discarded traffic volume data for each of said one or more first sample periods.

15. A non-transitory computer readable medium storing computer program comprising instructions which, when executed by an apparatus, cause the apparatus to:
obtain forwarded traffic volume data and discarded traffic volume data, wherein the forwarded traffic volume data relates to an aggregated volume of data forwarded over a point-to-multipoint communication network in each of a plurality of discrete time periods over an observation period and the discarded traffic data relates to a volume of data discarded at a central node of the network in each of the plurality of discrete time periods over the observation period;
generate calibrated forwarded traffic volume data and calibrated discarded traffic volume data by adding calibration data to the forwarded traffic volume data and the discarded traffic volume data respectively, wherein calibration data is dependent on application of multiple calibration levels;
filter multiple instances of said calibrated forwarded traffic volume data and multiple instances of said calibrated discarded traffic volume data to generate respective filtered calibrated forwarded traffic volume data and filtered calibrated discarded traffic volume data, wherein said filtered data are indicative of a distribution of energy present in the respective calibrated traffic volume data and wherein different instances of said calibrated volume data have different calibration levels;
determine, for each instance of said calibrated forwarded traffic volume data and said calibrated discarded traffic volume data whether periods of relatively high energy are concentrated in calibration data section(s) of the respective calibrated data of said filtered data or in traffic volume data of said filtered data and, if energy is determined to be concentrated in the traffic volume data, determining that the respective volume data has an energy level above the respective calibration level;
identify one or more first sample periods within said observation period, wherein said first sample periods correspond to time periods of the observation period where the filtered calibrated discarded traffic volume data has an energy level above a threshold calibration level; and
determine impact scores for the forwarded traffic volume data and the discarded traffic volume data for each of said one or more first sample periods.

* * * * *